Feb. 17, 1959  W. L. GASKELL  2,873,773
SHIFTABLE MOTOR DRIVE FOR TILTING ARBOR SAW
Filed June 14, 1954  10 Sheets-Sheet 1
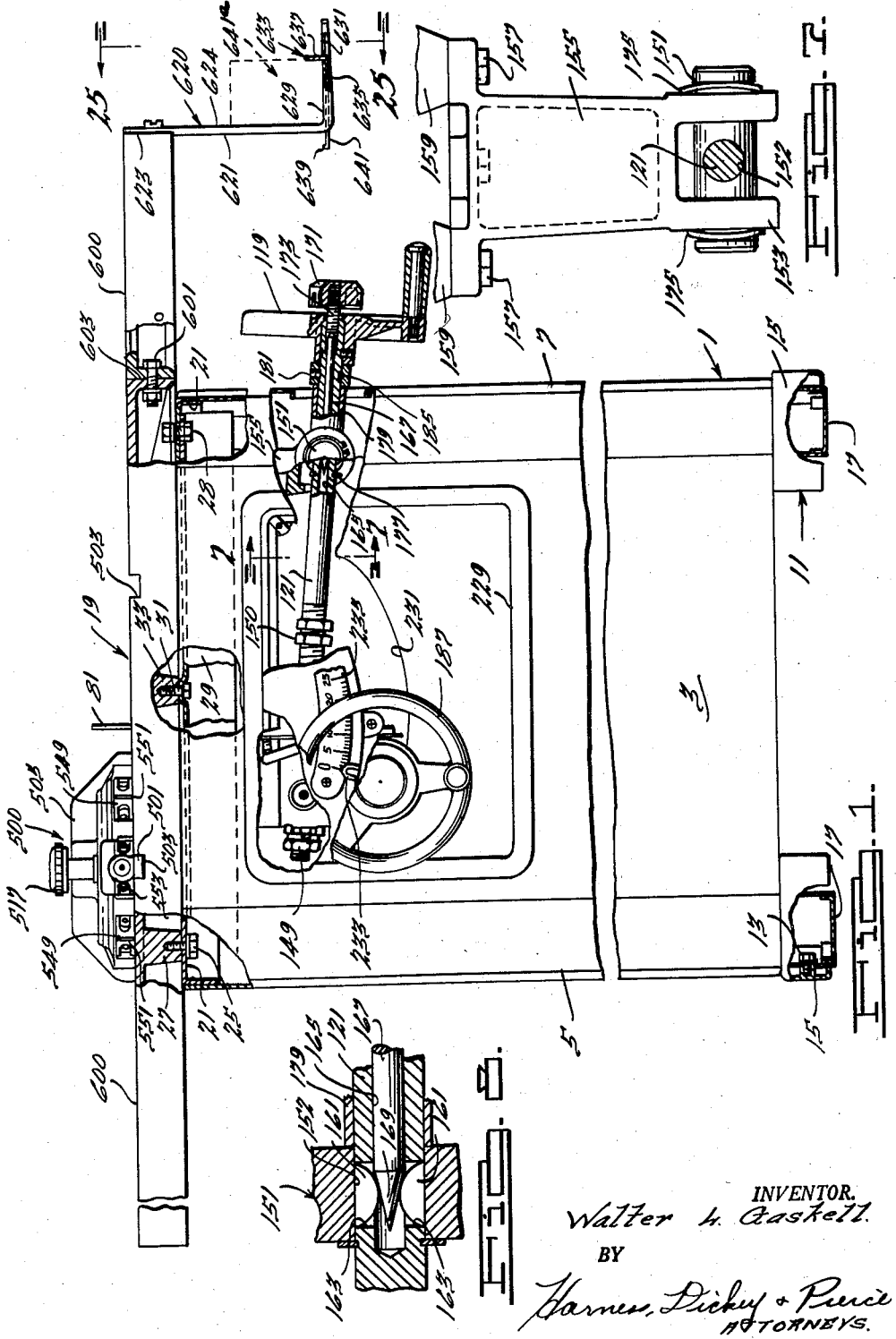
INVENTOR.
Walter L. Gaskell.
BY
Harness, Dickey & Pierce.
ATTORNEYS.

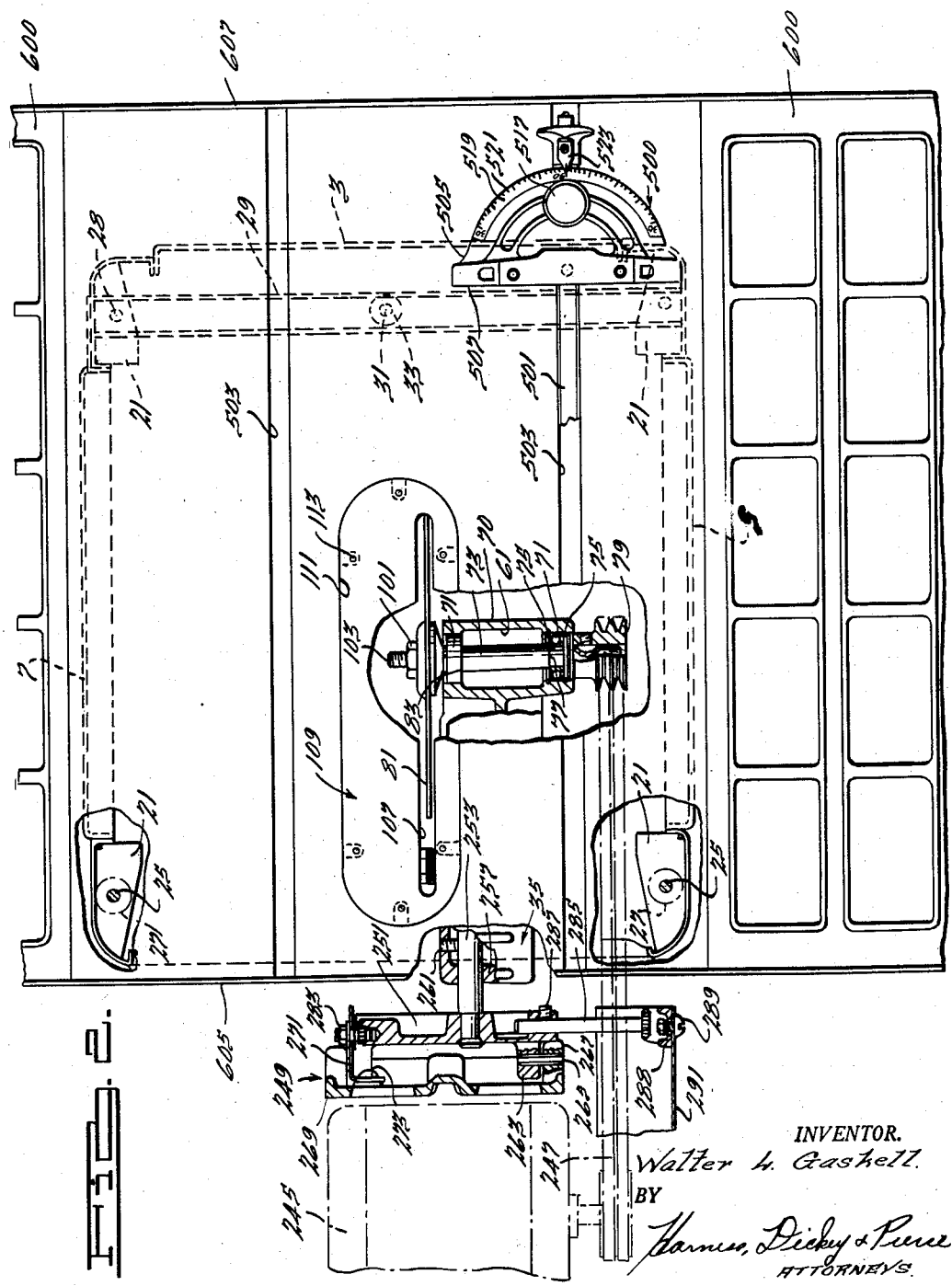

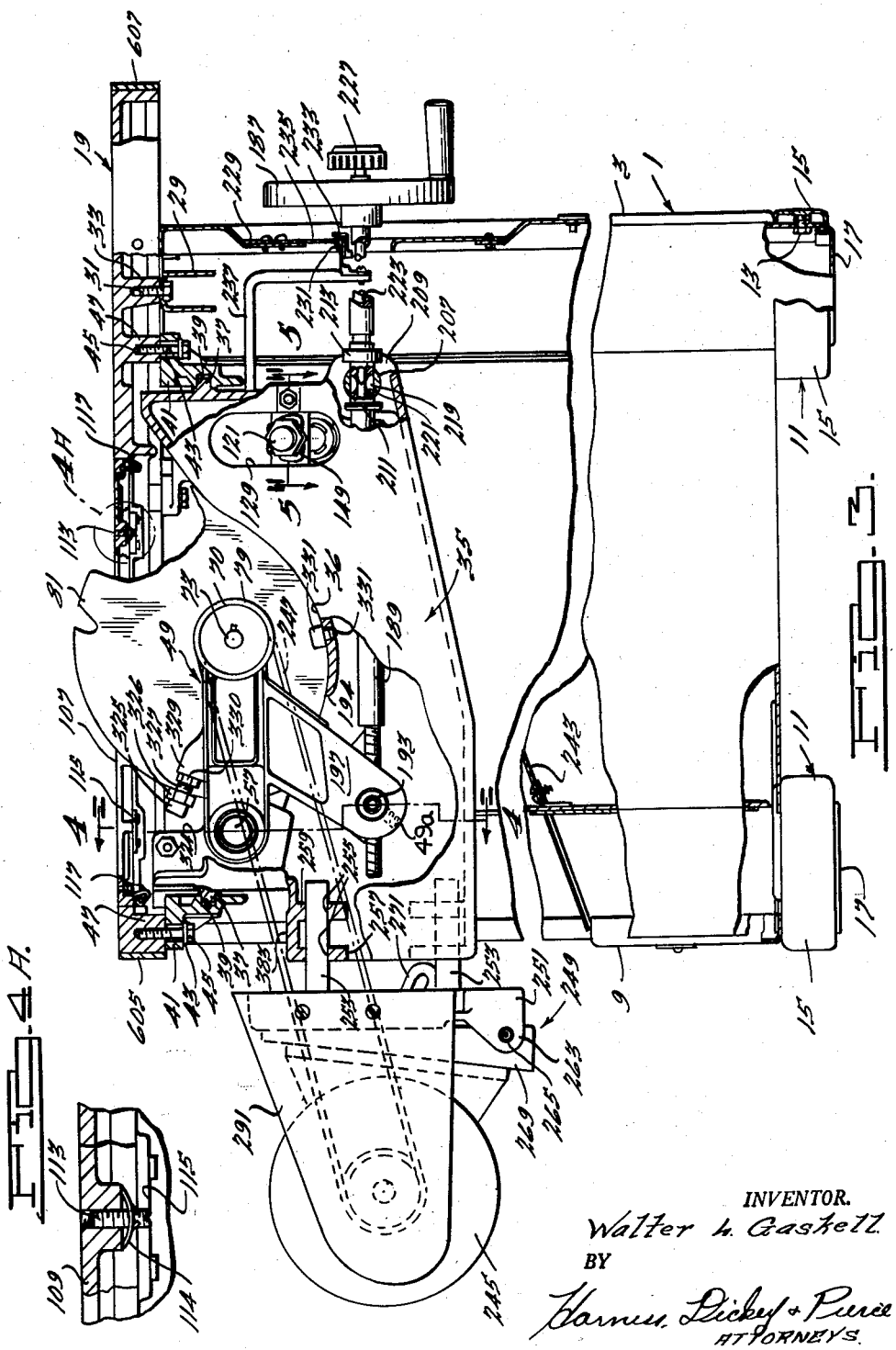

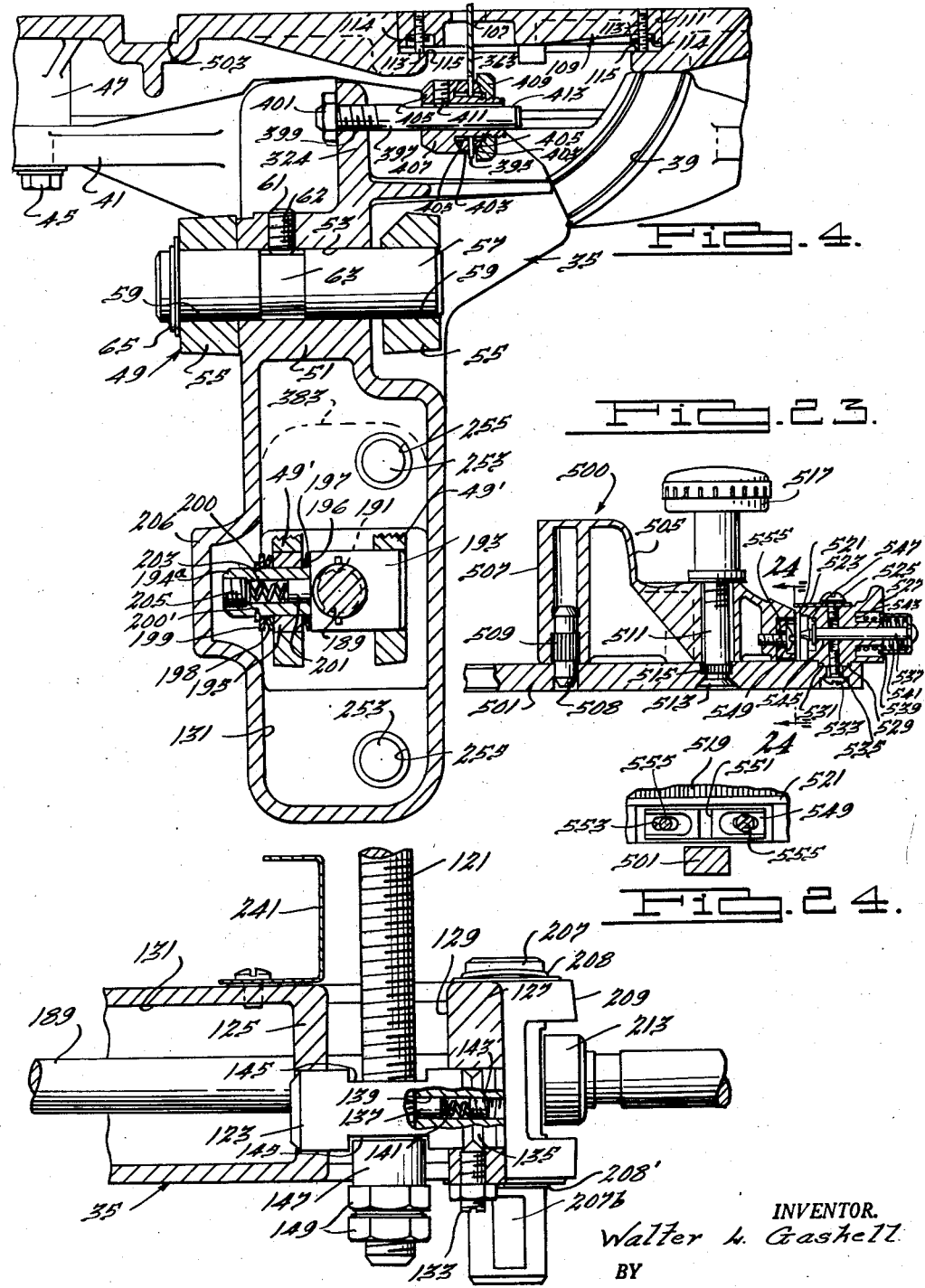

Feb. 17, 1959   W. L. GASKELL   2,873,773
SHIFTABLE MOTOR DRIVE FOR TILTING ARBOR SAW
Filed June 14, 1954   10 Sheets-Sheet 5

INVENTOR.
Walter L. Gaskell
BY
Harness, Dickey & Pierce
ATTORNEYS

Feb. 17, 1959 W. L. GASKELL 2,873,773
SHIFTABLE MOTOR DRIVE FOR TILTING ARBOR SAW
Filed June 14, 1954 10 Sheets-Sheet 6

INVENTOR.
Walter L. Gaskell
BY
Harness, Dickey & Pierce
ATTORNEYS.

Feb. 17, 1959 W. L. GASKELL 2,873,773
SHIFTABLE MOTOR DRIVE FOR TILTING ARBOR SAW
Filed June 14, 1954 10 Sheets-Sheet 7

INVENTOR.
Walter L. Gaskell.
BY
Harness, Dickey & Pierce,
ATTORNEYS.

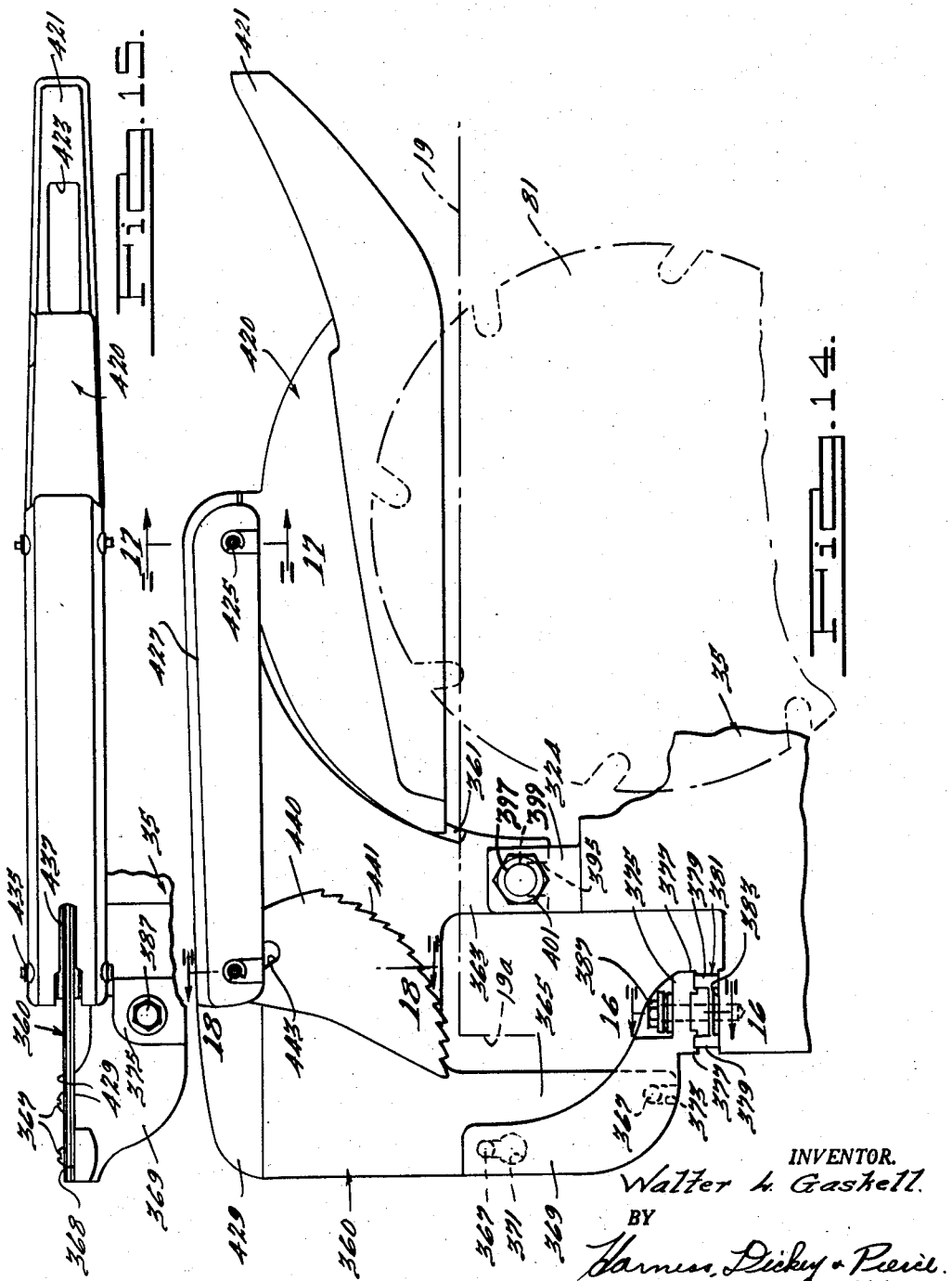

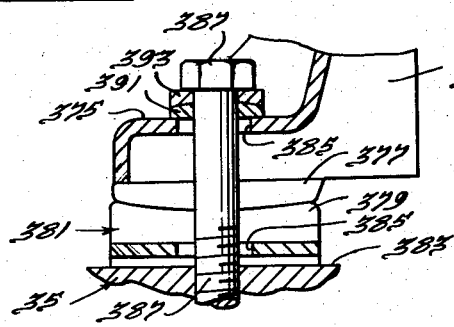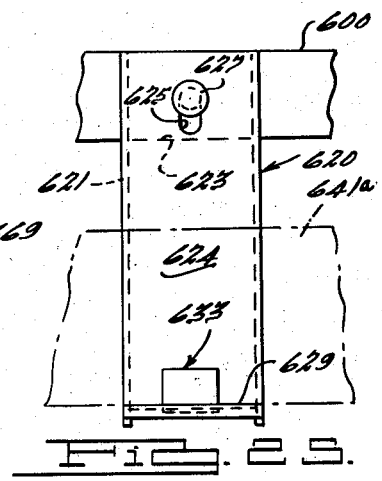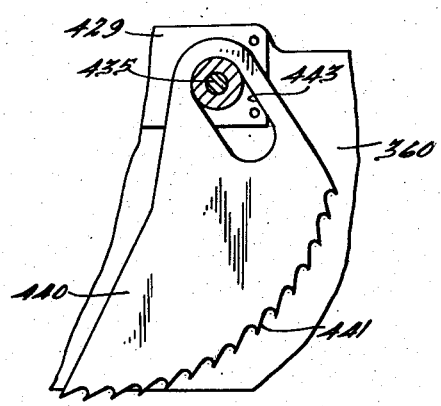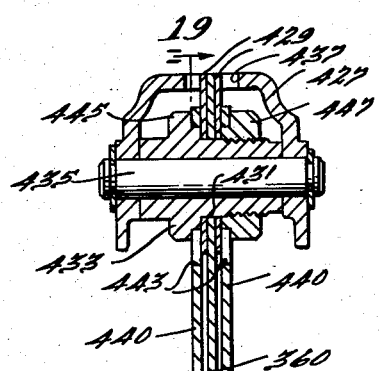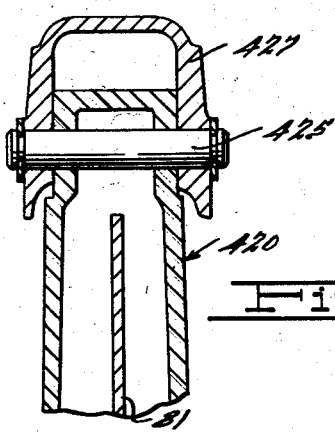

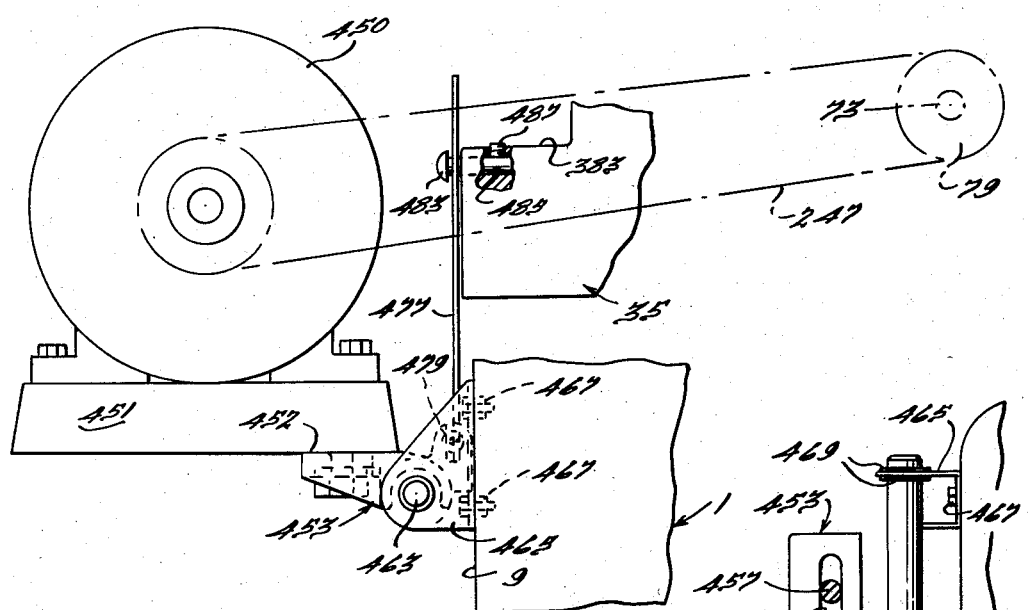

United States Patent Office 2,873,773
Patented Feb. 17, 1959

2,873,773

SHIFTABLE MOTOR DRIVE FOR TILTING ARBOR SAW

Walter L. Gaskell, Ypsilanti, Mich., assignor to King-Seeley Corporation, Ann Arbor, Mich., a corporation of Michigan Application June 14, 1954, Serial No. 436,450

1 Claim. (Cl. 143—36)

This invention relates to tilting arbor saws of the type commonly used in home workshops in working with wood.

In recent years there has been a very significant increase in interest in "Do-it-yourself" activities and one very popular field has been in making articles of wood. Inasmuch as this is ordinarily in the nature of a hobby, most people are not able to spend substantial sums of money to buy professional woodworking equipment and a special industry has grown up to supply rather low-priced tools for the home workshop. In order to achieve a low cost it was necessary to introduce mass production techniques into this industry and to modify the professional machine designs in such a way that they could be handled by mass production methods. This includes the simplification of parts and assemblies and elimination of unnecessary material, a process which, if carried too far, results in a tool that is too flimsy, one which is difficult to use, or one which turns out poor work.

It is the object of this invention to provide a woodworking arbor saw to meet the needs of the home workshop in that it can be produced and sold at a relatively low price but which surpasses previously known saws in its price field by being constructed to do a fully professional job of wood cutting. The low cost of manufacture is obtained in the present saw by various design features that make it possible to produce the component parts of the saw on a mass basis and then assemble them with a minimum of labor. In addition, the saw includes a number of design features that make it possible to accurately adjust the saw after final assembly so that it will be completely accurate and run true, thus reducing the dimensional tolerances which must be held on and among the various parts during the course of production. The improved saw also includes features of design which make it very strong and sturdy and not subject to distortion under load or when bolted in place on a floor. Improved features are also incorporated in the operating mechanism whereby the arbor is elevated and tilted and includes means for driving by a motor either or both the tilting and elevating mechanism.

The invention also provides improvements in the motor mount, the miter gage, the anti-kickback fingers, the splitter and saw guard construction, and a means for stowing certain accessories that are not being used, such as a fence.

A preferred embodiment of the invention is shown by way of illustration in the accompanying drawings in which:

Figure 1 is a front elevation of a tilting arbor wood saw embodying the invention and having parts in section and parts broken away;

Fig. 2 is a plan view of the saw with parts in section and parts broken away;

Fig. 3 is a side elevation of the left of the saw with parts broken away and parts in section;

Fig. 4 is a section along line 4—4 of Fig. 3 through the connections between the frame, the arbor arm, the elevating screw, and the splitter blade mounting and also showing the jackscrew mountings for the table insert;

Fig. 4a (Sheet 3) is an enlarged fragmentary view of the jackscrew mounting;

Fig. 5 is a section along line 5—5 of Fig. 3 showing the connection of the tilt screw to the frame;

Fig. 7 (Sheet 1) is a side elevation of the bracket for supporting the tilt screw;

Fig. 8 (Sheet 1) is an enlarged sectional view of the locking connection between the tilt screw and the swivel in the bracket of Fig. 7;

Fig. 14 is a side elevation of a splitter and saw guard assembly as mounted on a platform at the rear end of the frame, the frame being simplified by the omission of detailed construction so that its illustration is largely fragmentary and diagrammatic;

Fig. 15 is a plan view of the structure of Fig. 14;

Fig. 16 is a section on line 16—16 of Fig. 14 through the adjustable mounting between the splitter bracket and the frame platform;

Fig. 17 is a cross section along line 17—17 of Fig. 14;

Fig. 18 is a cross section along line 18—18 of Fig. 14;

Fig. 19 is a reduced size view of the anti-kickback finger as taken on line 19—19 of Fig. 18;

Fig. 20 is a side elevation with parts removed, broken away, and shown fragmentarily of a modified mount for supporting the weight of the motor on the cabinet rather than on the tiltable frame;

Fig. 21 is a plan view of the modified mount with parts removed and the shifter plate shown in section;

Fig. 22 is a rear view of the modified mount with the shifter plate pivot mounting partly in section and the motor removed;

Fig. 23 (sheet 4) is a section through the improved miter gage;

Figure 6:
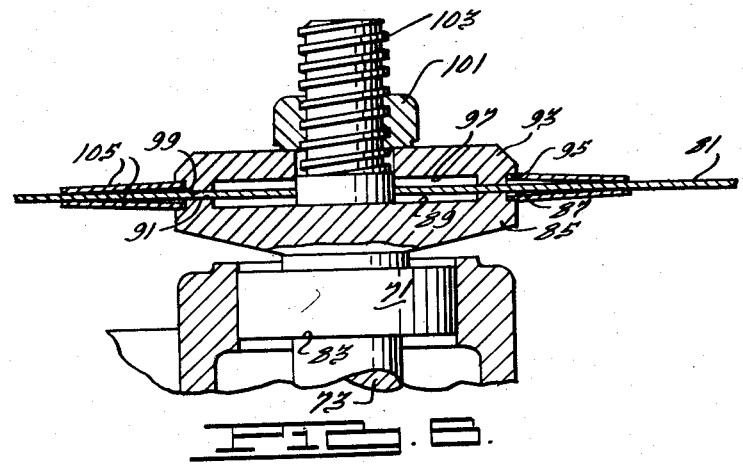
Fig. 6 is an enlarged sectional view of the saw blade mounting on the arbor arm.

Fig. 24 (sheet 4) is a view of the shoe used in the miter gage as seen from line 24—24 of Fig. 23; and Fig. 25 (sheet 9) is a detail view of the fence bar hanger as seen on line 25—25 of Fig. 1.

As seen in Figs. 1 and 3, the tilting arbor circular wood saw of this invention includes a sheet metal floor cabinet 1 that has a front side 3, a left side 5, a right side 7, and a back 9. The cabinet is provided with feet 11 at the four corners and around the outside of each is attached by bolts 13 a right angle die-cast buffer piece 15. Across the bottom of each foot is a rigid plate 17 that rests on the floor and which is provided with one or more holes (not shown) to receive bolts (not shown) for bolting the cabinet 1 to the floor.

The top of the cabinet 1 is open but covered by the heavy cast iron table plate 19 which is bolted at only three points to the cabinet. In order to provide these three points of attachment, the two rear top corners of the cabinet are provided with rigid brackets 21 (Fig. 2) having bolt holes through which bolts 25 extend upwardly to thread into lugs 27 cast on the bottom of the table 19. The two front corners of the cabinet are also provided with rigid brackets 21 and bolted to the underside thereof by bolts 28 is a downwardly presenting channel 29 (Figs. 1-3) extending across the front of the cabinet. At about the center of the channel, there is provided a hole for bolt 31 which extends upwardly to thread into a lug 33 on the bottom of the table 19. The three bolts 25 and 31 thus rigidly secure the table to the cabinet at three points. This arrangement makes it possible to bolt the feet 11 of the cabinet 1 to the floor without necessarily transmitting distortions in the cabinet to the table top, as the latter can be independently adjusted about its three points of support on the top of the cabinet.

Figure 9:
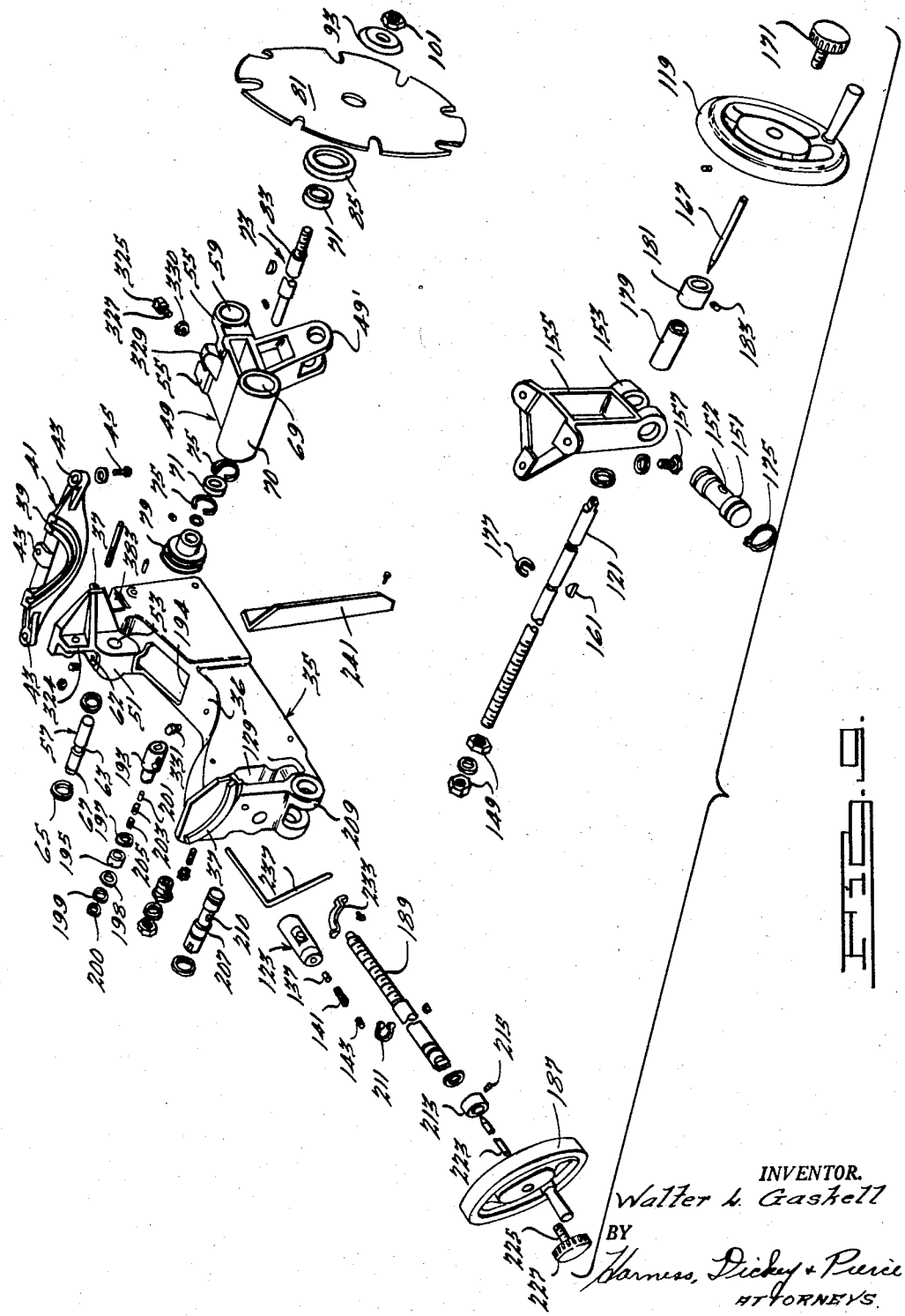
Fig. 9 (Sheet 6) is an exploded view of most of the parts of the operating mechanism.

The table plate 19 carries all of the operating mechanism for the saw, and no part of such mechanism has any direct connection with the cabinet. In other words, all load and forces from the operating mechanism pass first through the table 19 and then through the cabinet 1. By virtue of its size and location, the central part of the operating mechanism is the frame 35 which is mounted at each end on the underside of the table 19 so that it will tilt or swing through an arc of about 45 degrees about an axis lying on the top surface of the table and running perpendicular to the front edge of the table. The frame 35 (see Fig. 9) is a hollow closed metal casting that is bellied down at 36 in the mid-section to accommodate vertical movement relative thereto of the saw arbor. Adjacent the tops of the front and rear faces of the frame 35 are curved shoes 37 (Figs. 9 and 3) that fit in similarly curved recesses or ways 39 (Figs. 9, 3, and 4) in front and rear table carried trunnions 41, the trunnions 41 each having three oversize bolt holes 43 to receive bolts 45 whereby they are rigidly secured to lugs 47 on the bottom of the table 19, the oversize permitting some shifting at assembly to correct misalignments and accommodate manufacturing tolerances. The shoes 37 slide in ways 39 to provide the tilting movement referred to above.

The arbor arm 49 (Figs. 2, 3, 4, and 9) is hinged on the frame 35 for movement up and down relative to the frame. The frame 35 has a boss 51 cast thereon adjacent the rear end with a transverse bore 53 therein. The arbor arm 49 is bifurcated with the spaced leg portions 55 (Fig. 4) thereof fitting on opposite sides of the boss 51. The arbor arm pivot pin 57 extends through the bore 53 and into holes 59 in the arm to pivotally support it on the frame 35. A set screw 61 in hole 62 of the frame 35 engages a reduced diameter portion 63 of the pin 57 to control axial movement thereof. The pin may also be axially positioned by a split, snap-on retaining ring 65 engaged in a groove 67 at the end of the pin 57.

The arbor arm 49 has a transverse bore 69 in the boss 70 at its forward end that contains spaced ball bearing sets 71 that rotatably support the arbor 73, snap rings 75 fitting in suitable grooves on opposite sides of a set 71 to take thrust on the set from arbor shoulder 77. The arbor 73 protrudes from opposite sides of the arm 49 and on its left end (as viewed from the front of the cabinet) a pulley sheave 79 (Fig. 2) is keyed to furnish means for rotating the arbor. The circular saw blade 81 is clamped on the right end of the arbor 73 against shoulder 83, it being noted that this particular unit is intended particularly for a 10" diameter blade though, of course, the design is not so limited. As seen best in Fig. 6, the bearing set 71 abuts shoulder 83 and abutting the bearing set is an inner washer 85 that is relieved on the outside corner of its outer diameter to provide a recess 87 and counterbored on its inner diameter at 89 to provide an annular end face 91. An outer washer 93 has its inside face machined so that it is identical to the ouside face of the inside face of washer 85. Thus, washer 93 is relieved on the inside corner of its outer diameter to provide recess 95 and counterbored on its inner diameter at 97 to provide an annular end face 99. The washers 85 and 93 are clamped directly against the blade 81 so that faces 91 and 99 are on opposite sides thereof, a nut 101 on the threaded right hand end 103 of the arbor providing the clamping pressure. When cuts are not too deep to interfere, I prefer to also engage the blade with annular spring steel collars 105 that seat on their inner diameters in recesses 87 and 95. As can be seen best in Fig. 6, the collars 105 are very slightly conical so that only the outer peripheral portions thereof engage the blade. The spring support thus provided by the collars 105 serves to reduce wobble and dampen vibrations of the blade 81 resulting in a smoother cut. In an actual 10" blade unit, good results have been achieved when the collars 105 are #18 gauge (.0478") and are 2¼" I. D., 4" O. D. and have an axial length in the free state of about .100", the depth of recesses 87 and 95 being about .060 which is also the compressed axial length of the collars 105 in assembly.

The blade 81 is closely adjacent the right side face of the frame 35 and projects up through a saw slot 107 in the die cast table insert 109 that fits in the arbor nut access opening 111. The insert has leveling or jack screws 113 (Figs. 4 and 4a) which bear upon pairs of pads 115 on opposite sides of the opening 111 that are cast on the bottom of table 19. The screws 113 extend through threaded holes and are tensioned by extending each through a speed nut 114 one size smaller than is meant for that size screw and can be threadably adjusted in the speed nuts to make insert 109 flush with the table top. Spring clips 117 (Fig. 3) may be secured to the insert to engage the ends of the opening 111 to yieldably hold the insert in position.

The blade 81 is tilted about an axis in and lengthwise of slot 107 by a handwheel 119 (Fig. 1) that is located outside the cabinet 1 on the right hand side thereof. The wheel hub is removably mounted on the end of the tilt screw 121 by means of a non-circular socket or the equivalent so that rotation of the handwheel rotates the screw. The inside or opposite end of the screw 121 (Fig. 5) is threaded diametrically through a pivot pin 123 which is pivotally supported in the walls 125 and 127 of an opening 129 through the frame 35, it being observed that the opening 129 does not open into the hollow interior 131 of the frame 35. The pin 123 is held in axial position by a radial dog screw 133 threaded in wall 127 and having its conical end riding in V groove 135 cut in the periphery of the pin, unloosening of the screw allowing some axial play of the pin to accommodate eccentricities in the screw 121. Play of the screw 121 is removed by a plug 137 of soft but tough non-metallic material such as nylon which rides in an axial opening 139 in the pin 123 and is pressed by spring 141 against the thread of the screw 121 to in turn press it against the internal thread (not shown) through swivel pin 123 which is engaged by the screw, the spring being confined under compression in bore 139 by set screw 143 threaded into the end of the pin 123. The portions of the pin 123 through which the screw 121 extends are machined off square as shown at 145 and the outside face is engaged at zero tilt position by the square end of collar 147 adjacent nuts 149 on the inside end of screw 121. The nuts 149 along with nuts 150 may be used to furnish stops limiting tilting movement.

In addition to the support furnished by pin 123, the screw 121 is supported by a swivel pin 151 (Figs. 1, 7, and 8) through the bore 152 of which an unthreaded portion of the screw extends transversely of the axis of the pin, the pin 151 being journaled in the bifurcated bottom 153 of a bracket 155. The bracket 155 is rigidly secured by bolts 157 to lugs 159 on the bottom of table 19, preferably at three points. The frame 35 and the bracket 155 thus furnish all of the support for the screw 121 and since they are directly connected to the table 19 distortion of the cabinet 1 will not affect operation of the screw.

Locking of the screw 121 in a position of desired tilt angle is accomplished by a pair of diametrically opposite semi-circular Woodruff keys 161 (Fig. 8) that fit in key slots 163 in the screw 121. The straight edges of the keys are adjacent the wall of bore 152 in pin 151 and the curved edges are disposed inside of an aperture 165 extending from the outside end of the screw 121. A lock rod 167 slidable in aperture 165 has a pointed end surface 169 formed therein so that when the rod is pushed inwardly the keys 161 will ride up the surface 169 and jam against the wall of bore 152 to lock the screw against rotation in the bore, thus fixing the tilted position of the saw blade. The rod 167 is moved inwardly to achieve this result by a lock knob 171 (Fig. 1) that has a stem 173 threaded into the end of screw 121 to abut the end of rod 167. When the knob 171 is unscrewed, the rod 167 will become loose in aperture 165 allowing the keys 161 to move radially inwardly and unlock the screw 121, the depth of slots (thickness of wall of aperture 165) being great enough to keep the keys in proper alignment.

Bowed snap rings 175 (Fig. 7) fit in suitable grooves on opposite ends of pin 151 and abut the outside of bracket portion 153 to take up tolerance and axially locate the swivel pin 151 and may allow some small axial floating thereof, it being possible to increase such floating by use of wave washers as indicated hereinafter in connection with pin 193. This in combination with oversize holes in bracket 155 through which bolts 157 extend permits lateral adjustment at the bracket 155 end of the screw 121 to properly line it up and take care of eccentricities, in assembly the screw 121 being assembled first in pin 123. The axial position of screw 121 is fixed with respect to the swivel 151 by snap ring 177 fitting in a suitable groove on screw 121 on the inner side of the swivel 151 and by a spacer collar 179 engaging on one end the outer side of the swivel 151 and on the other a collar 181 fixed in axial position on the screw by a set screw 183 (Fig. 9) engaging flat 185 on the screw.

The blade 81 is elevated and lowered by a handwheel 187 (Fig. 3) that is located in front of the cabinet 1. The handwheel 187 is mounted on the outside end of elevating screw 189 by means of a non-circular opening and set screw arrangement, or the equivalent, whereby rotation of the handwheel rotates the screw. The screw extends through an opening in the lower part of frame wall 125 and through the interior 131 (Fig. 5) of frame 35 so that its inside end can thread through a tapped bore 191 (Fig. 4) in a swivel pin 193 that is journaled in the bifurcated portion of arbor arm 49 which extends into the frame interior 131 through opening 194 in the top of the frame 35. The swivel pin 193 has a turned down hollow or tube end 194a on which is loosely slipped a ring 195. Between the ring 195 and the shoulder 196 of pin 193 is a wave spring washer 197 and on the outer side of the collar 195 is another wave spring washer 198 held against the collar by a plain washer 199 and a snap ring 200 seated in groove 200' on the tube. With this arrangement the entire pin 193 assembly can be inserted from the left side of the frame as seen in Fig. 4 into legs 49' of the arm 49 through a hole in the frame. A set screw 49a (Fig. 3) bears against collar 195 to hold the pin 193 assembly in the arm; but it will be seen that spring washers 197 and 198 permit axial floating of pin 193 and its tube end 194 relative to the collar and arm. The tube 194 contains a plug 201 of soft, tough material such as nylon which is forced against the threads of screw 189 to press them into the threads of bore 191 to remove play, a spring 203 being compressed against plug 201 by set screw 205. The left side of frame 35 is embossed outwardly at 206 to accommodate the tube and movement thereof and has a suitable opening (not shown) to permit access to the screw 205 and insertion of the swivel pin assembly.

The screw 189 is supported adjacent its front end by a swivel pin 207 (Fig. 3) that is journaled on opposite side walls 209 of a bifurcated front end portion on frame 35, an unthreaded part of the screw 189 extending through a transverse bore 210 in the pin. The swivel pin is axially positioned by snap rings 208 and 208' (Fig. 5), one of which is bowed to permit some axial floating, and the screw is axially positioned with respect to the pin 207 by a snap ring 211 engaged in a groove (not shown) on the screw and abutting one side of the pin, while a collar 213 engages the other side and has a set screw 215 therein engaged in a groove in the screw. The locking means for screw 189 is the same as for screw 121 (Fig. 8) and comprises semicircular Woodruff keys 219 in slots in the screw that open into aperture 221. A rod plunger 223 in hole 221 has a tapered end that engages the keys to push them against the wall of bore 210 when it is abutted and moved by the stem 225 of knob 227 that is threaded in the outer end of aperture 221.

Since the elevating screw 189 is carried entirely by frame 35 it will tilt therewith and to accommodate such movement an insert plate 229 (Figs. 1 and 3) in the front wall 3 of cabinet 1 has an arcuate slot 231 through which the screw extends. In order to indicate the angle of tilt, a pointer 233 is juxtaposed to a scale 235 on the insert 229, the pointer being carried by rod 237 attached to the front of the frame 35.

The elevating screw is housed almost entirely in the frame 35 where sawdust cannot easily reach it. To protect the threaded end of the tilt screw from sawdust an angle-shaped vertical shield 241 (Fig. 5) is screwed to the right side of the frame 35 forward of the blade 81. An inclined partition 243 spanning the full cross section of the cabinet 1 serves as a chute to collect sawdust and chips and deliver them to the open rear side 9 of the cabinet 1.

Figure 10:
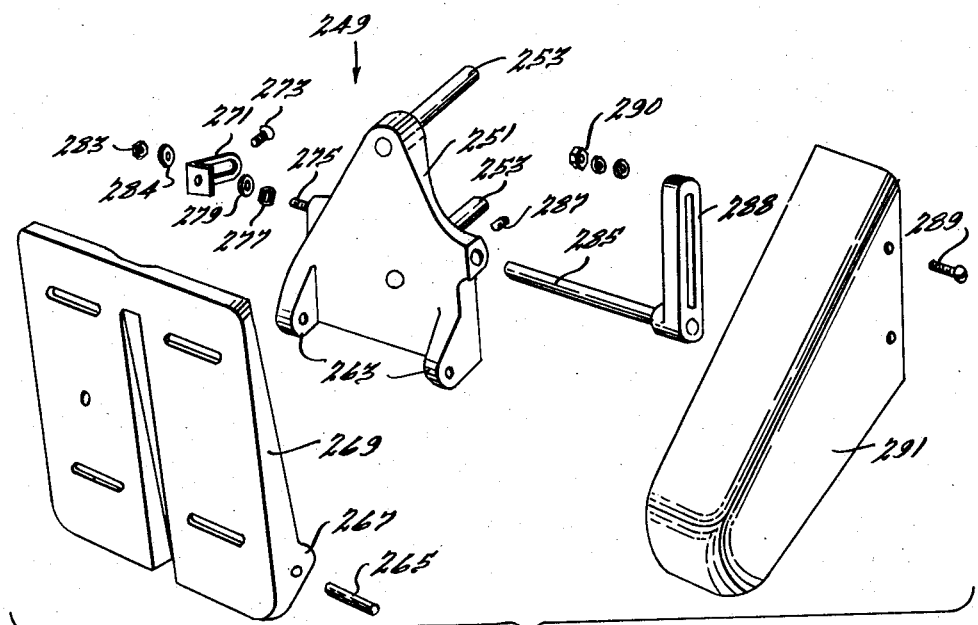
Fig. 10 (Sheet 5) is an exploded view of the motor mount which is attached to the tiltable frame.

The frame 35 is rugged enough to carry a motor 245 (Figs. 2 and 3) that drives pulley belts 247 which run over pulley sheave 79 to rotate arbor 73 and blade 81. The motor mount 249 (Figs. 2, 3, and 10) includes a bracket 251 that has two rigid rods 253 spaced one above the other which fit in holes 255 in walls 257 and 259 formed in the frame 35. Set screws 261 in the frame 35 engage the rods to fix their position and the distance of bracket 251 from the arbor 73. The bracket 251 has lugs 263 on opposite sides of the bottom edge thereof and pivoted in these lugs, by means of pins 265 which fit in lugs 267 depending therefrom, is a motor base plate 269. The plate 269 and motor attached thereto can automatically pivot fore and aft on pins 265 to accommodate like movement of the pulley 79 as the arbor 73 is elevated by pivoting about the axis of arbor arm hinge 57, thus maintaining a fairly constant tension on the pulley belts. In order to dampen or suitably restrain movement of the motor on pins 265 a bracket 271 is attached by bolt 273 to the front face of plate 269. A pin 275 on bracket 251, over which is placed a plain washer 277 and a spring washer 279, extends through an arcuate slot 281 in the bracket 271, the bracket 271 being clamped with the desired pressure against the washer 279 by a nut 283 threaded on to the end of pin 275 over washer 284. A rod 285 extends horizontally from the side of bracket 251 and is fixed in position by a set screw 287. The rod carries a slotted vertical bracket 288 which receives screws 289 and nut and washers 290 for clamping in various vertical positions a pulley belt shield 291.

Figure 11:
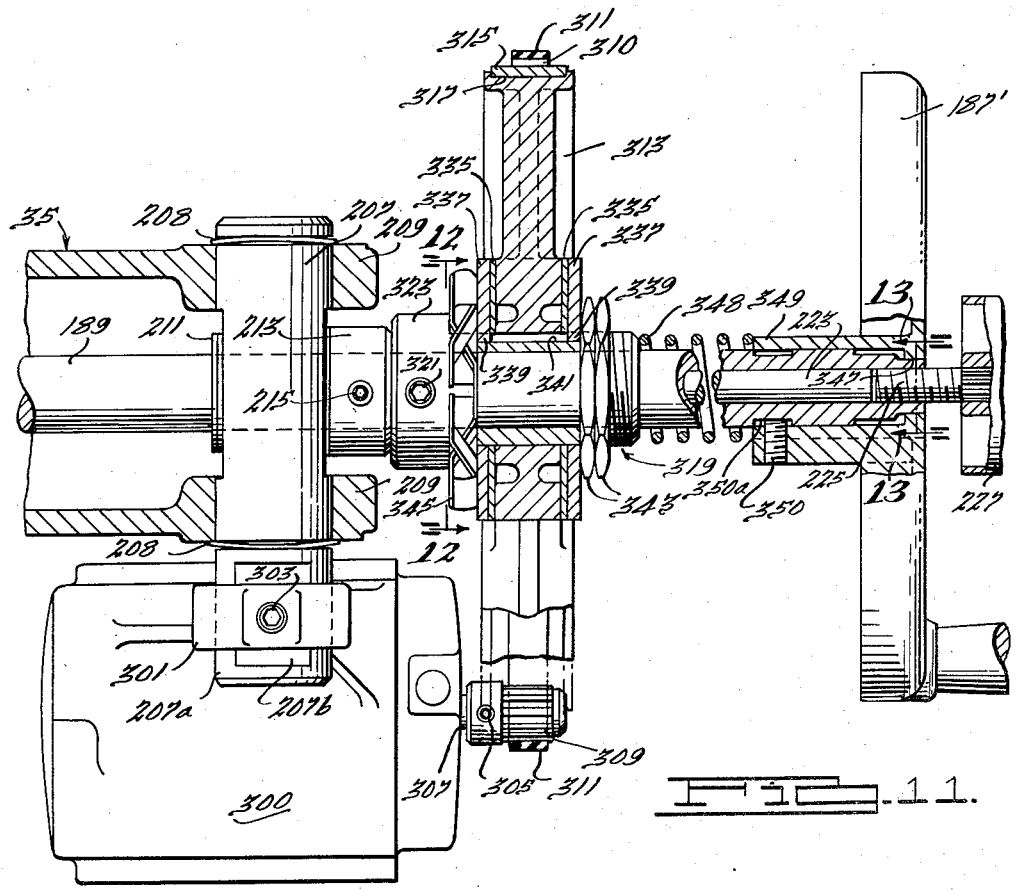
Fig. 11 (Sheet 7) is a fragmentary sectional view of the connection between the elevating screw and the front end of the frame and includes mechanism whereby the elevating screw may be either motor driven or manually operated.
Figure 13:
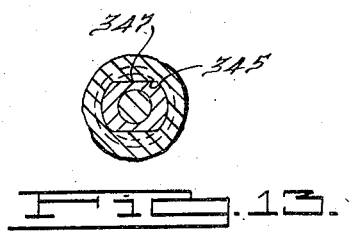
Fig. 13 is a section along line 13—13 of Fig. 11 showing the square drive connection between handwheel and elevating screw to provide for manual rotation.
Figure 12:
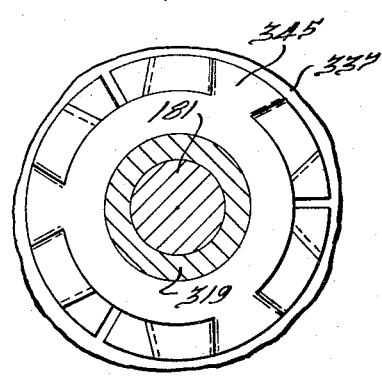
Fig. 12 is an enlarged section along line 12—12 of Fig. 11 and shows the wave type spring washer, a member that is available on the open market.

If desired, a motor drive for either or both elevating and tilting may be added to the saw operating mechanism already described, Figs. 11–13 showing a motor drive for elevation and the same sort of arrangement being capable of use for tilting. The reversible motor 300 for the power drive is conveniently hung on an extension 207a of the swivel pin 207 by means of a bracket 301 cast or secured on the motor, a set screw 303 extending therethrough to be tightened against flat 207b on the swivel pin. The electrical controls for the motor are not shown and may be any suitable sort of switch arrangement for controlling the motor circuit. Secured by set screw 305 on the motor shaft 307 is a toothed or grooved pulley 309 that engages the teeth 310 on the inner periphery of a cog belt 311. The belt 311 runs around the periphery of a large disc 313 and the teeth 310 grip a frictional lining 315 that sets in a peripheral groove 317 of the disc. Thus rotation of the motor 300 will drive belt 311 and rotate disc 313 which is mounted on elevating screw shaft 189.

Disc 313 is mounted on a sleeve 319 but not keyed to it. The sleeve 319 is keyed to the shaft 189 by a set screw 321 through sleeve flange 323 so that the sleeve and shaft rotate together. A yieldable connection between the disc 313 and sleeve 319 is provided which will slip in the event power is applied when the arbor arm 49 has reached the limit of its up or down travel. At the upper limit a rib 324 (Fig. 3) on frame 35 is engaged by a rubber bumper stop 325 which is bonded on a nut 326 that threads on the end of a stud 327 which threads into boss 329, a nut 330 serving to lock the stud in desired position. At the lower limit the boss 70 at the front end of arm 49 engages a rubber bumper stop 331 (Fig. 3) bonded on screw 333 which threads into an opening in the belly 36 of frame 35. The yieldable connection between the sleeve 319 and disc 313 which will slip in the event that the arm 49 is forced too hard against rubber stops 325 or 331 includes radial friction washers 335 secured on the outer faces of the disc 313. Engaged with the friction clutch discs or washers are steel clutch plate washers 337 which have keys 339 formed therein that fit in a longitudinal keyway 341 in the sleeve 319 so that washers 337 rotate with the sleeve. It is evident that if sufficient friction exists between washers 335 and 337 rotation of the disc 313 will be transmitted to sleeve 319 and thence to shaft 189. Pressure is applied to create such friction by nuts 343 that are threaded on the end of sleeve 319 to force disc 313 toward sleeve flange 323 and thus compress wave spring 345 to a desired degree. Thus if Woodruff keys 219 are released and shaft 189 is free to rotate the motor 300 can drive it through a friction clutch arrangement until the arbor arm 49 contacts a stop whereupon the clutch will slip to prevent additional application of torque to the shaft and connected parts. It will also be noted that in the event of excessive torque, slippage may also occur between belt teeth 310 and lining 315 but this cannot be as accurately controlled as can the friction clutch just described by means of control nuts 343.

The screw 189 can also be turned manually by handwheel 187' which has a non-circular hole 345 that fits a corresponding projection 347 on the end of shaft 189 to provide a key connection between the handwheel and shaft. Normally, however, a coil spring 348 confined between sleeve 319 and the end of handwheel hub 349 will just push the handwheel hole 345 off the end of the shaft, set screw 350 being loosened from shaft flats 350a, so that upon rotation of the shaft by the motor it will turn in the hub 349 without turning the handwheel. The handwheel is prevented from working off the shaft 189 by the knob 227, the stem 225 of which threads into the end of shaft 189 to bear upon lock plunger 223 as previously described.

A splitter plate 360 (Figs. 14–19 and omitted from previous figures for sake of clarity) may be carried by the frame 35 and mounted thereon so that it may be made precisely coplanar with the saw blade 81. The plate 360 has a sharpened front edge 361 that enters the slot cut in a piece of wood by the saw blade. It has a front leg 363 which extends down through slot 107 in the table insert 109 (omitted for sake of clarity from Fig. 14) to be connected to rib 324 on the frame 35; and it has a rear leg 365 which extends over the rear edge 19a of the table 19 and down behind the cabinet 1 where it is clamped by screws 367 against the vertical side face 368 of the splitter bracket 369, slotted holes 371 and 373 in the splitter plate permitting it to be taken off the bracket 369 without removing the screws 367. The splitter bracket 369 is illustrated as a curving die casting that is provided with a horizontal ledge 375 that is flat on top and provided on the bottom with a pair of curved ribs 377, downwardly convex, which extend in a direction parallel to the axis of the saw blade, i. e., parallel to arbor 73. The ribs 377 ride on concave ribs 379 in a shoe 381. See Fig. 16. The shoe is flat ribbed on the bottom and sits on the flat platform 383 at the rear of frame 35. The ribs 377 and 379 are preferably curved about an axis through the center of slot 107 and lying on the surface of table 19. The ledge 375 and the shoe 381 have oversize slotted holes 385 therein through which a bolt 387 extends to thread into hole 389 in the frame platform 383, the slots 385 permitting adjustment of the shoe and bracket relative to each other along their arcs of curvature and also transversely on the platform. The head of bolt 387 seats on a pair of complemental spherical washers 391 and 393, bottom washer 391 having an upwardly presenting convex spherical surface on which is seated the downwardly presenting concave spherical surface of the upper washer 393. These washers permit proper shouldering of the bolt even though the bracket 369 is shifted on the shoe.

As indicated above and as best seen in Fig. 14, the front leg 363 of the splitter blade 360 is mounted on a rib 324 of the frame 35, this being done by an open bottom slot 395 in the leg which fits over a horizontal rod 397 that threads into hole 399 in the rib and is locked therein by nut 401. It is evident that the various spherical washers, seats, and surfaces described in connection with the mounting of splitter plate 360 on frame 35 will permit it to be angularly adjusted, as well as transversely shifted, so that it can be rigidly fixed in the plane of the saw blade 81.

The splitter plate 360 serves as means to carry the die cast saw blade guard 420 which is inverted U shape in cross section to fit over the blade 81 and has a handle portion 421 at the front with an opening 423 in it through which the top of the table 19 can be seen. The guard 420 is suspended by pivot pin 425 from the front end of guard arm 427, the pin 425 being located so that the bottom of the guard hangs in an approximately horizontal position. The top part of the splitter plate 360 is reinforced by strips 429 spot welded thereto and through an aperture 431 in the strips and plate extends a sleeve 433 that is centrally apertured to receive pivot pin 435 which supports the rear end of arm 427 to provide means whereby the guard 420 may be pivoted up and over so that it is upside down and hanging over the rear of the table 19, such movement being permitted by slot 437 in the top of arm 427.

On opposite sides of the splitter plate 360 are antikickback fingers 440 of a shape best seen in Fig. 19. They have ratchet teeth 441 on the bottom which will dig into the wood on opposite sides of the plate 360 to prevent undesired movement thereof toward the front of the saw. The fingers 440 have slots 443 formed therein by means of which they are mounted on the sleeve 433 between strips 429 and the shoulder 445 on the sleeve and the nut 447 which threads on the end of the sleeve. The slot 443 is an important feature as it permits automatic adjustment of the fingers to different wood thicknesses and by locating it on an angle, as shown, the teeth are automatically brought into proper position for most effective ratchet action in preventing kickback of the wood by the blade 81. By virtue of the relation among the arc on which the teeth 441 are formed, the angle of the teeth, and the depth and angle of slot 443, the finger 440 will swing to the left when wood is pushed into the saw (to the left) and the clockwise angle between the tooth which engages the wood and the horizontal will be smaller than the angle which exists when the wood is moved to the right, it being desirable to have this angle less than but close to 90 degrees for best anti-kickback action. Further, when the wood moves to the right the finger 440 will rise up and the bottom of slot 443 will strike the pivot pin with a jerk that drives the ratchet tooth into the wood and grips it against further movement to the right.

Figs. 20–22 show a modified form of motor mounting in which the motor 450 is not carried by frame 35 but is supported on the back wall 9 of the cabinet 1, the mounting being such as to permit the motor to traverse parallel to the arbor 73 as the frame 35 and its pulley 79 are tilted through various angles to the vertical. The motor is mounted on any suitable base 451 which in turn is bolted along its front edge to a pad 452 of bracket 453, slots 455 in the bracket receiving the bolts 457 and permitting substantial shifting of the motor on the mounting. The pad 452 is offset from lugs 459 and 461 of the bracket which have aligned bearing apertures therein by means of which the bracket 453 is hingedly and slidably mounted on rod 463, the motor shaft being on the right side of Fig. 22 when the motor is mounted on pad 452. The rod is pivotally carried by bracket plates 465 which are secured by bolts 467 or other means to the rear wall 9 of the cabinet 1, split washers 469 engaging opposite sides of a bracket plate 465 to hold the rod in position. The bracket 453 has a pair of lugs 471 on top into which are threaded pointed screws 473 which fit in apertures 475 formed at the bottom of shifter plate 477 by welding a grooved bottom strip 479 thereto, the plate 477 therefore being pivoted on lugs 471. The plate 477 has a vertical slot 481 therein through which extends a pin 483 that fits in an aperture 485 in the rear of frame 35 and is secured in position by a set screw 487. It will be seen that as frame 35 is tilted the short pin 483 will bear against an edge of slot 481 to slide the bracket 453 on rod 463 to maintain proper alignment of the motor pulley and pulley 79. The motor 450 overhangs the rod 463 and therefore throws a load on the belt 247 tending to keep it properly tensioned. As the arbor 73 is raised or lowered, the motor 450 can pivot on rod 463 to compensate for the change in center distance between the motor shaft and the arbor 73.

An improved miter gage construction 500 is shown in Figs. 1, 2, 23, and 24 and includes a bar 501 that fits in miter slots 503 machined in table top 19. The head 505, with its flat vertical face 507, is pivoted on the bar 501 by pin 508 which is press fitted into the head, this being facilitated by grooved surface 509 on the pin. A stud 511 with a peened head 513 fitted in the bottom of the bar is press fitted therein, facilitated by grooves 515, and threaded at the top to receive knob 517 which can be screwed thereon to clamp the head 505 securely to the bar 501 and prevent pivotal movement of face 507. In order to locate the face 507 on the proper angle, the head is provided with graduations 519 along edge 521 which is curved about the center of pin 508 and these cooperate with a pointer 523 that is secured by screw 525 to the top of block 527 which has a key 529 thereon fitting in transverse slot 531 in the bar 501 and is secured to the bar by screw 533 which extends through an oversize hole 535 therein to permit shifting adjustments of the block. A centering pin 537 has a cap 539 secured at one end and this houses a coil spring 541 that shoulders at 543 on the block and urges the pin away from head 505 so that normally shoulder 545 thereon engages inside face 547 of the head. The centering pin 537 cooperates with three shoes 549 that are located beneath graduations 519 in angu-larly spaced, cut-out lower corner portions of the curved edge 521. The shoes 549 have center slots 551 therein which cooperate with the pin 537 when the latter is pressed forward and by precisely positioning the three slots 551 on the desired angles, such as 45, 90, and 45 degrees and using them with the pin 537 the face 507 can be quickly and exactly positioned on these angles and clamped therein by knob 517. The shoes have slotted openings 553 therein on either side of vertical slots 551 for screws 555 which thread into the head 505, the slots 553 permitting some angular shifting of the shoes to enable the vertical slots 551 to be precisely positioned.

As seen in Figs. 1–3, the table 19 may be provided with extensions in the form of cast grills or grids 600 that are bolted by bolts 601 to the side faces 603 of the table top. A transverse bar 605 may extend across the backs of the table and extensions and be bolted thereto and at the front a fence bar slide (not shown) or a front bar 607 may be bolted to the front faces of the table and extensions. With this arrangement, the two extensions can be handled as a unit when they are unbolted from faces 603 and the bars 605 and 607 (or fence slide) are unbolted from the rear and front of table 19.

In order to provide a handy place to stow the rip fence (not shown), the splitter assembly, the miter gage, and other parts that may be used with the saw, I provide two hanger brackets 620 (Figs. 1 and 25), one near the front and one near the rear of the side face of an extension 600 (or of the table 19). The brackets 620 preferably include an angle shaped sheet metal stamping 621, with side flanges to strengthen it, and a sharp-edged notch 623 at the top corner to fit the side face of the table or table extension. The vertical leg 624 of the bracket is slotted at 625 to receive a bolt 627 for attaching it to the side face. The bottom or horizontal leg 629 of the bracket, shown partly in section in Fig. 1, has an opening 631 through which is extended a clip 633, the clip and leg 629 being spot welded together as indicated at 635, the ends of the clip 633 being turned up to form flanges 637 and 639, and one end 641 of the clip overhanging the leg 624 of the bracket to form a hook means for the miter gage, splitter and guard assembly, etc. The fence bar assembly 641a will be easily supported on the two brackets 620 by placing it between legs 624 and flanges 637 as shown in phantom in Figs. 1 and 25.

Certain constructions shown herein are also disclosed in my copending application Serial No. 76,937, filed February 17, 1949, now Patent 2,695,638, issued November 30, 1954.

I claim:

In a tilting arbor wood saw or the like, a cabinet having a table top, a laterally tiltable frame within said cabinet having an arbor arm thereon movable up and down, an arbor carried by said arbor arm, a motor, a belt drive between said arbor and motor, a horizontal rod mounted adjacent the back wall of the cabinet and extending parallel to the surface of the table and to a plane defined by the arbor, a pad slidable back and forth on said rod, said motor being carried by said pad and having its axis parallel to the rod, said pad having a vertical plate pivoted thereon and located adjacent the back face of the frame, and a stud projecting out of the frame and working in a vertical slot in said plate and acting to slide the pad and motor on the rod when the frame tilts.

References Cited in the file of this patent

UNITED STATES PATENTS

| 103,347 | Lepp | May 24, 1870 |
| 525,603 | Horstmeier | Sept. 4, 1894 |
| 816,326 | Hill | Mar. 27, 1906 |
| 984,237 | Osburn | Feb. 14, 1911 |
| 1,185,095 | Hendee | May 30, 1916 |

(Other references on following page)

UNITED STATES PATENTS

| | | |
|---|---|---|
| 1,314,291 | Wallace | Aug. 26, 1919 |
| 1,380,707 | Fehrm | June 7, 1921 |
| 1,384,742 | Clark | July 19, 1921 |
| 1,841,939 | De Koning et al. | Jan. 19, 1932 |
| 1,900,553 | Hampton | Mar. 7, 1933 |
| 1,985,614 | Merrigan | Dec. 25, 1934 |
| 1,988,102 | Woodward | Jan. 15, 1935 |
| 2,008,673 | Ocenasek (1) | July 23, 1935 |
| 2,010,882 | Ocenasek (2) | Aug. 13, 1935 |
| 2,020,222 | Tautz (7) | Nov. 5, 1935 |
| 2,067,652 | Tautz (2) | Jan. 12, 1937 |
| 2,095,330 | Hedgpeth | Oct. 12, 1937 |
| 2,121,069 | Collins (1) | June 21, 1938 |
| 2,142,303 | Crouch | Jan. 3, 1939 |
| 2,167,744 | Cosby et al. | Aug. 7, 1939 |
| 2,208,582 | Hollister | July 23, 1940 |
| 2,265,406 | Tautz (3) | Dec. 9, 1941 |
| 2,265,407 | Tautz (4) | Dec. 9, 1941 |
| 2,292,872 | Eastman | Aug. 11, 1942 |
| 2,352,235 | Tautz | June 27, 1944 |
| 2,530,290 | Collins (2) | Nov. 14, 1950 |
| 2,586,530 | Godfrey | Feb. 19, 1952 |
| 2,590,035 | Pollak | Mar. 18, 1952 |
| 2,625,966 | Copp | Jan. 20, 1953 |
| 2,661,777 | Hitchcock | Dec. 8, 1953 |
| 2,684,695 | Howell | July 27, 1954 |
| 2,690,084 | Van Dam | Sept. 28, 1954 |
| 2,695,638 | Gaskell | Nov. 30, 1954 |

FOREIGN PATENTS

| | | |
|---|---|---|
| 222,593 | Switzerland | Jan. 4, 1943 |